US012777239B2

(12) United States Patent
Lai

(10) Patent No.: US 12,777,239 B2
(45) Date of Patent: Oct. 27, 2026

(54) OPTICAL ENGINE WITH MULTIPLE LIGHT SOURCES

(71) Applicant: PixArt Imaging Inc., Hsin-Chu County (TW)

(72) Inventor: Hung-Yu Lai, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 54 days.

(21) Appl. No.: 18/971,003

(22) Filed: Dec. 6, 2024

(65) Prior Publication Data

US 2025/0126338 A1 Apr. 17, 2025

Related U.S. Application Data

(63) Continuation of application No. 18/376,063, filed on Oct. 3, 2023, now Pat. No. 12,206,967, which is a continuation of application No. 18/098,663, filed on Jan. 18, 2023, now Pat. No. 11,812,130, which is a continuation of application No. 17/375,035, filed on Jul. 14, 2021, now Pat. No. 11,595,554, which is a continuation of application No. 16/547,568, filed on Aug. 22, 2019, now Pat. No. 11,095,799.

(60) Provisional application No. 62/756,110, filed on Nov. 6, 2018.

(51) Int. Cl.

| | |
|---|---|
| ***H04N 23/54*** | (2023.01) |
| ***G05D 1/00*** | (2024.01) |
| ***G05D 1/249*** | (2024.01) |
| ***H04N 23/55*** | (2023.01) |
| ***H04N 23/56*** | (2023.01) |

(52) U.S. Cl.
CPC ........... *H04N 23/54* (2023.01); *G05D 1/0246* (2013.01); *G05D 1/249* (2024.01); *H04N 23/55* (2023.01); *H04N 23/56* (2023.01)

(58) Field of Classification Search
CPC ........ H04N 23/50; H04N 23/54; H04N 23/55; H04N 23/56; G05D 1/0246; G05D 1/249; G03B 15/03
See application file for complete search history.

(56) References Cited

U.S. PATENT DOCUMENTS

2003/0080187 A1* 5/2003 Piva .................... G06K 7/1092 235/454
2021/0152681 A1 5/2021 Yoon et al.

FOREIGN PATENT DOCUMENTS

| | | |
|---|---|---|
| CN | 102591000 A | 7/2012 |
| CN | 110763202 A | 2/2020 |
| CN | 111142314 A | 5/2020 |

* cited by examiner

*Primary Examiner* — Thanh Luu
(74) *Attorney, Agent, or Firm* — WPAT, PC

(57) ABSTRACT

There is provided an optical engine for a navigation device including a first light source, a second light source, a lens, a barrier structure and an image sensor. The barrier structure has a first space for containing the first light source, a second space for containing the lens and a third space for containing the second light source and the image sensor. The reflected light associated with the first light source propagates to the image sensor via the lens in the second space. The reflected light associated with the second light source propagates to the image sensor via the third space without passing through the lens in the second space.

19 Claims, 6 Drawing Sheets

OPTICAL ENGINE WITH MULTIPLE LIGHT SOURCES

RELATED APPLICATIONS

The present application is a continuation application of U.S. application Ser. No. 18/376,063, filed on Oct. 3, 2023, which is a continuation application of U.S. application Ser. No. 18/098,663, filed on Jan. 18, 2023, which is a continuation application of U.S. application Ser. No. 17/375,035, filed on Jul. 14, 2021, which is a continuation application of U.S. application Ser. No. 16/547,568, filed on Aug. 22, 2019, which claims the priority benefit of U.S. Provisional Application Ser. No. 62/756,110, filed Nov. 6, 2018, the disclosure of which is hereby incorporated by reference herein in its entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an optical engine having multiple light sources and, more particularly, to an optical engine having multiple light sources adapted to navigation devices.

2. Description of the Related Art

The optical navigation device uses a light source to illuminate a working surface and uses an image sensor to capture reflected light from the working surface to generate image frames. A processor calculates a moving distance and/or speed of the navigation device with respect to the working surface according to the image frames.

However, different working surfaces generally have different reflectivity that causes image features contained in the image frames to have apparent variations. Accordingly, a navigation device capable of distinguishing working surfaces of different materials is required.

SUMMARY

The present disclosure provides an optical engine that employs multiple light sources to be switched corresponding to different working surfaces to be applicable to the operation on different working surfaces.

The present disclosure further provides an optical engine having multiple light sources having a barrier structure to prevent the interference between emission light and reflected light of different light sources.

The present disclosure provides an optical engine including a substrate, a barrier, a first light source, a lens, a second light source and an image sensor. The barrier is disposed on the substrate and comprising a first opening, a second opening and a third opening. The first light source is arranged inside the first opening and electrically coupled to the substrate, and configured to generate emission light leaving the first opening in a direction perpendicular to the substrate. The lens is arranged inside the second opening. The second light source is arranged inside the third opening and electrically coupled to the substrate. The image sensor is disposed on the substrate, and configured to receive reflected light of the first light source via the second opening or receive reflected light of the second light source via the third opening.

The present disclosure further provides an optical engine including a substrate, a barrier, a first light source, a lens, a second light source and an image sensor. The barrier is disposed on the substrate and comprising a first opening, a second opening and a third opening. The first light source is arranged inside the first opening and electrically coupled to the substrate, and configured to generate emission light leaving the first opening in an angle tilted away from the second opening and the third opening. The lens is arranged inside the second opening. The second light source is arranged inside the third opening and electrically coupled to the substrate. The image sensor is disposed on the substrate, and configured to receive reflected light of the first light source via the second opening or receive reflected light of the second light source via the third opening.

The present disclosure provides an optical engine including a substrate, a barrier, a first light source, a lens, a second light source and an image sensor. The barrier is disposed on the substrate and comprising a first surface, a second surface and a third surface, wherein the first surface has a first opening, the second surface has a second opening and the third surface has a third opening, and the second surface is lower than the first and third surfaces. The first light source is arranged inside the first opening and electrically coupled to the substrate, and configured to generate emission light leaving the first opening in a direction perpendicular to the substrate. The lens is arranged inside the second opening. The second light source is arranged inside the third opening and electrically coupled to the substrate. The image sensor is disposed on the substrate, and configured to receive reflected light of the first light source via the second opening or receive reflected light of the second light source via the third opening.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure provides an optical engine having multiple light sources. The optical engine has a barrier structure for protecting the elements therein and preventing the interference between emission light of different light sources and reflected light from a working surface to improve the identification accuracy. The optical engine is adapted to, for example, a navigation device operating on the working surface, e.g., a cleaning robot, but not limited thereto.

Figure 1:
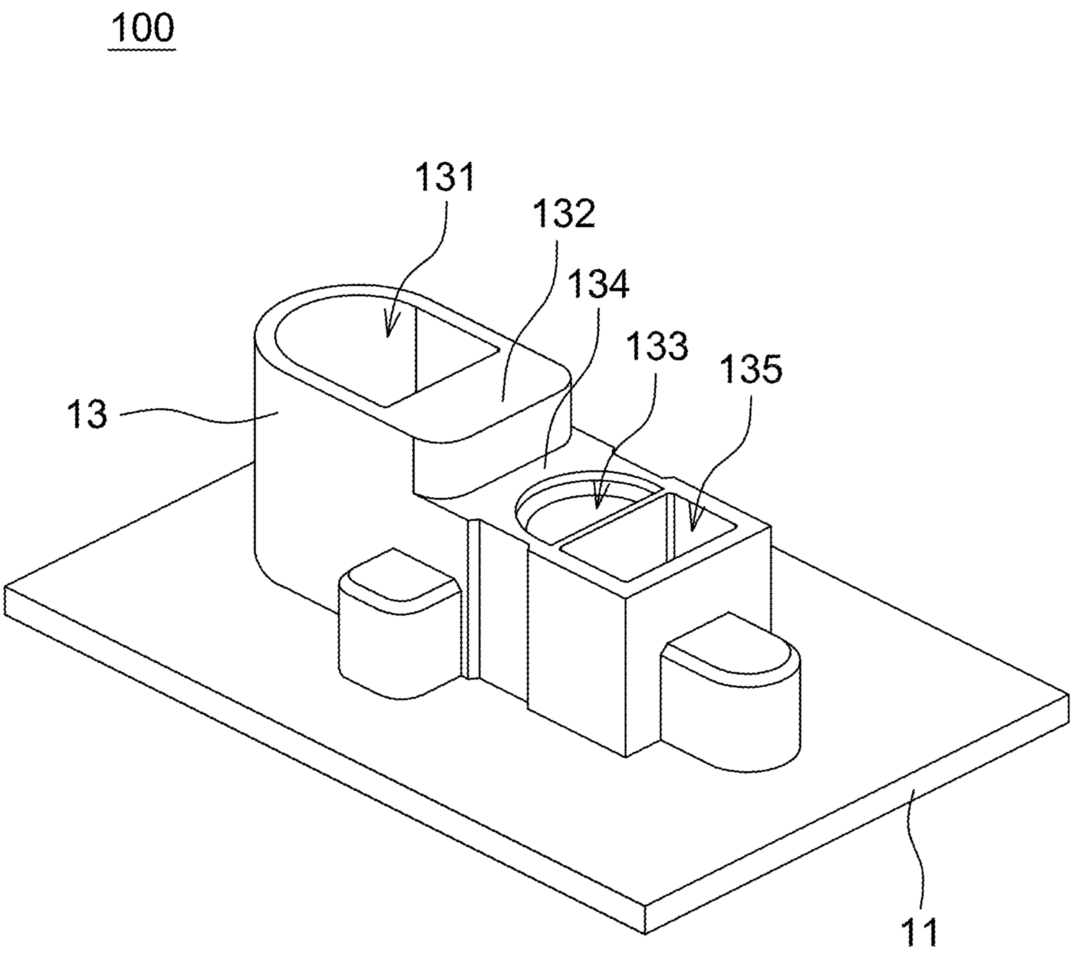
FIG. 1 is a solid diagram of an optical engine according to one embodiment of the present disclosure.
Figure 2:
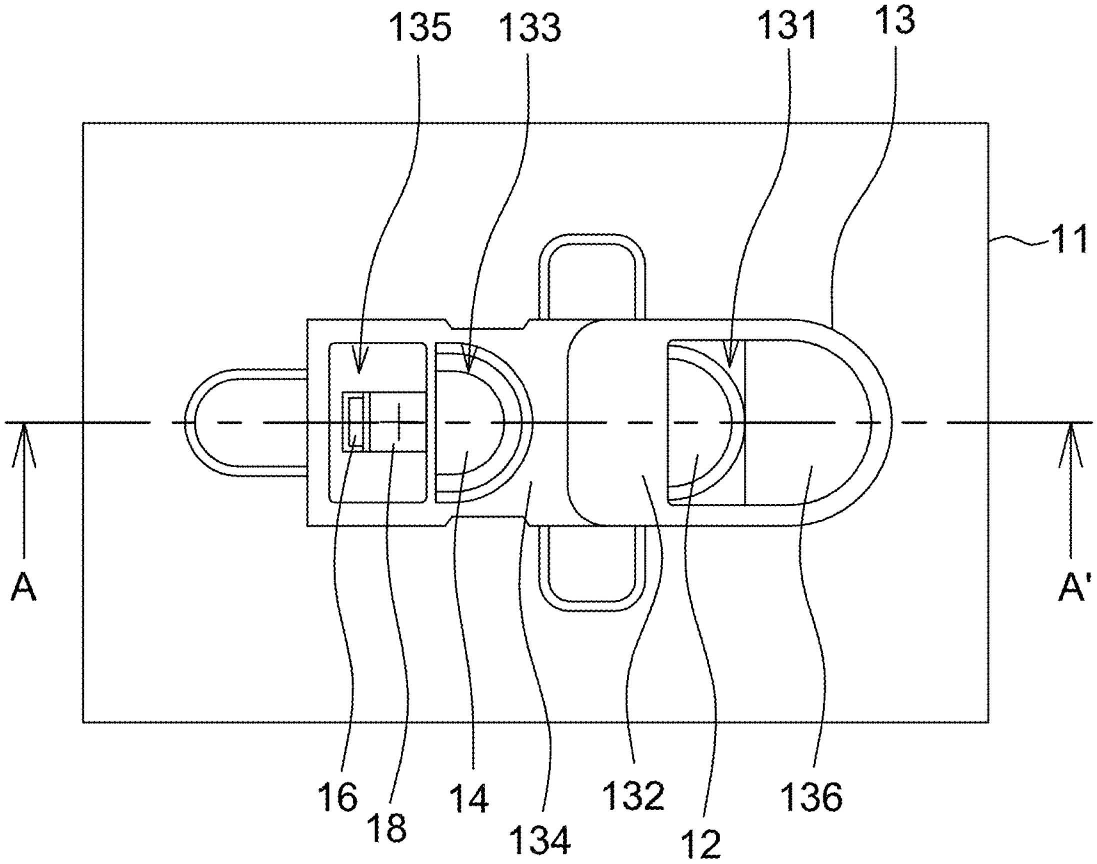
FIG. 2 is an upper view of an optical engine according to one embodiment of the present disclosure.
Figure 3:
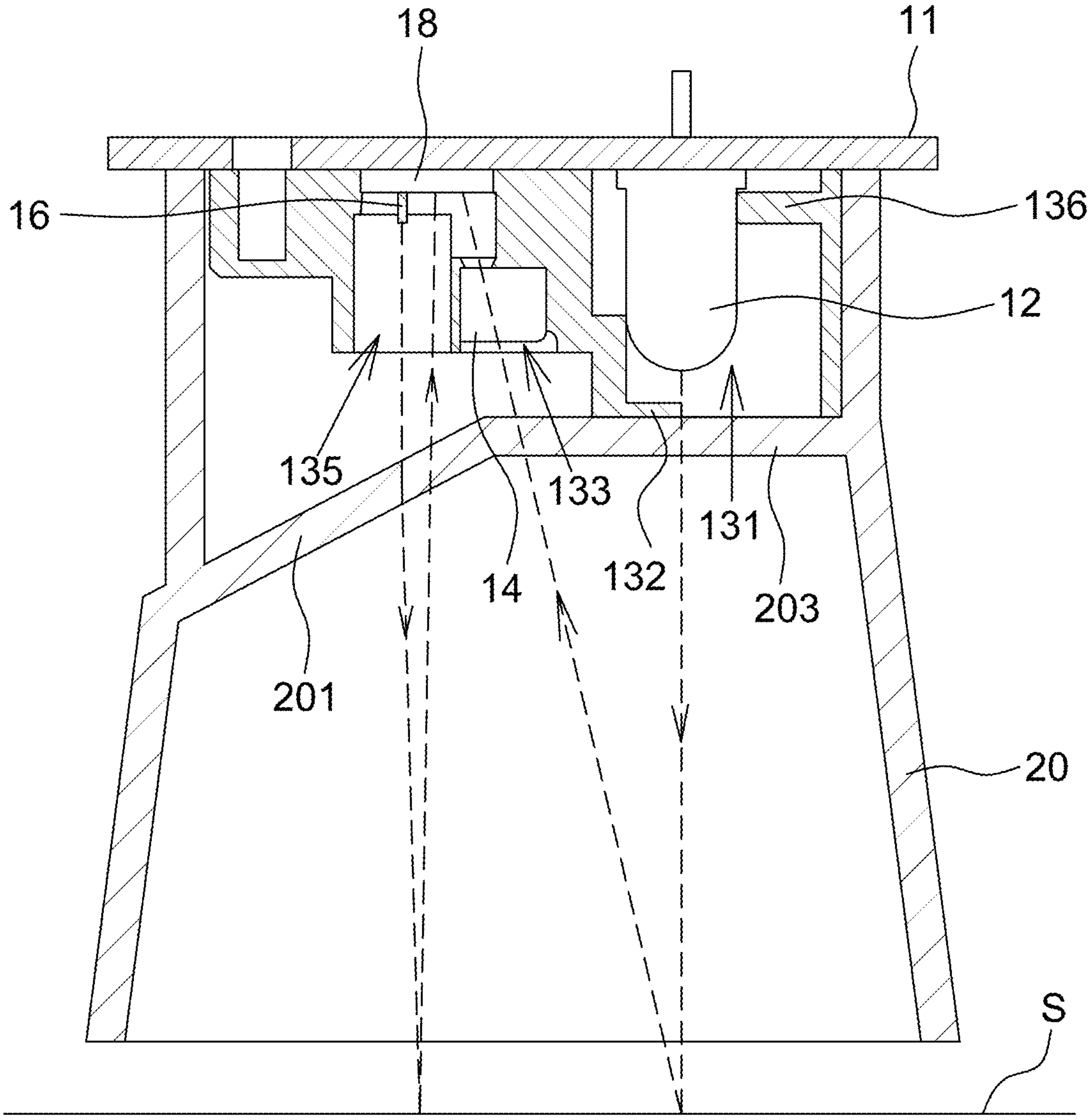
FIG. 3 is a cross-sectional view of the optical engine and a hood alone line A-A' in FIG. 2.

Referring to FIGS. 1 to 3, FIG. 1 is a solid diagram of an optical engine 100 according to one embodiment of the present disclosure; FIG. 2 is an upper view of an optical engine 100 according to one embodiment of the present disclosure; and FIG. 3 is a cross-sectional view of the optical engine 100 alone line A-A' in FIG. 2 and a hood 20.

Figure 6:
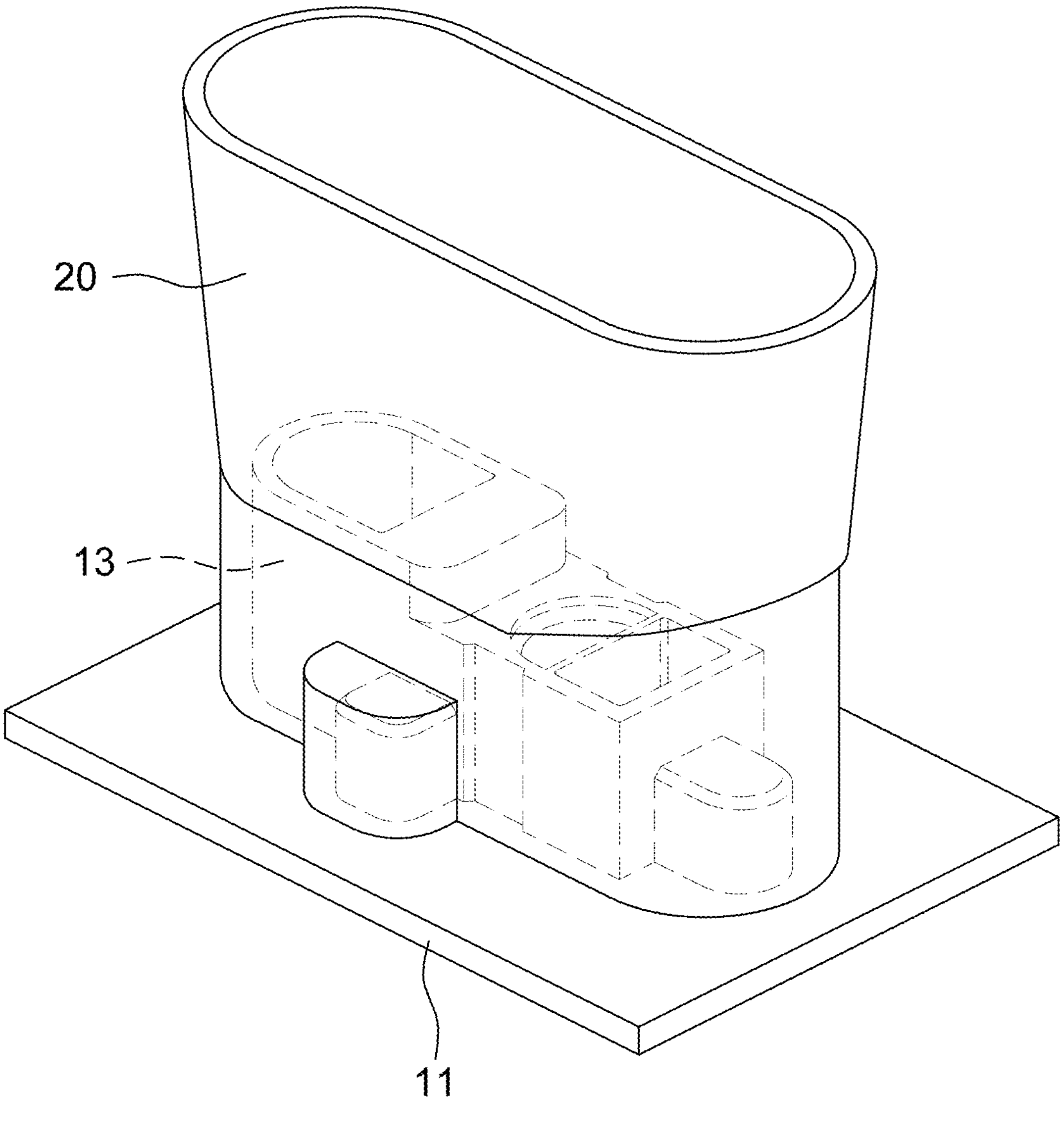
FIG. 6 is another solid diagram of an optical engine according to one embodiment of the present disclosure.

The optical engine 100 includes a first light source 12, a lens 14, a second light source 16, an image sensor 18, a substrate 11 and a barrier structure 13 disposed on the substrate 11, wherein the barrier structure 13 is attached to the substrate 11 via glue or screwing member without particular limitations. The substrate 11 is a printed circuit board (PCB) or a flexible substrate without particular limitations. In some embodiments, the optical engine 100 further includes a hood 20 (further referring to FIG. 6) arranged on the substrate 11 and covering the barrier structure 13 for dust protection and blocking ambient light. The hood 20 is attached to the substrate 11 via glue or screwing member without particular limitations.

The barrier structure 13 is preferably not transparent to the light emitted by the first light source 12 and the second light source 16. The material of the barrier structure 13 is not particularly limited, such as plastic, and is manufactured by, for example, injection molding. The barrier structure 13 has a first plane surface 132 and a second plane surface 134 parallel to the substrate 11. In one aspect, the first plane surface 132 is higher than the second plane surface 134. The first plane surface 132 has a first opening 131 to have a first space therebelow. The second plane surface 134 has a second opening 133 and a third opening 135 adjacent to each other to respectively have a second space and a third space therebelow. Said openings and spaces are used as the tunnel for light beams propagating in and out the barrier structure 13.

The first light source 12 is arranged inside the first opening 131 (i.e. in the first space) and electrically coupled to the substrate 11 to receive control signals and power therefrom. The first light source 12 is described herein using a light emitting diode as an example (e.g., infrared light emitting diode, but not limited to). The first light source 12 is used to generate emission light leaving the first opening 131 in a direction substantially perpendicular to the substrate 11 to illuminate the working surface S. For fixing the first light source 12, in some aspects the barrier structure 13 further includes a protrusion structure 136 pressing against the first light source 12. It should be mentioned that although FIG. 3 shows that the protrusion structure 136 perpendicularly extends from the barrier structure 13 in a transverse direction, it is only intended to illustrate but not to limit the present disclosure. In other aspects, the protrusion structure 136 extends from the barrier structure 13 with a tilt angle (e.g., upward or downward) to press against a surface of the first light source 12. In other aspects, the side wall surrounding the first opening 131 (or the first space) of the barrier structure 13 is manufactured to have a larger thickness to directly attach to the side of the first light source 12 to fix the first light source 12 therein without forming the transverse protrusion structure 136, i.e. the first light source 12 just fitting the first space.

The lens 14 is arranged inside the second opening 133 (or the second space) to guide reflected light from the working surface S and associated with the first light source 12 to the image sensor 18. In some aspects, in order to be able to arrange the lens 14 into the second opening 133, the lens 14 is cut to reshape the appearance thereof (e.g., having non-circular cross-section). It should be mentioned that although FIG. 3 shows that a single lens 14 is arranged inside the second opening 133, the present disclosure is not limited thereto. Corresponding to different applications, a lens set having more than one lens is arranged in the second opening 133, and the barrier structure 13 is formed with a structure to carry said lens set.

The second light source 16 is arranged inside the third opening 135 (i.e. in the third space) and electrically coupled to the substrate 11 to receive control signals and power therefrom. The second light source 16 is described herein using a laser diode as an example (e.g., infrared laser diode, but not limited to). The second light source 16 is used to generate emission light leaving the barrier structure 13 via the third opening 135 to illuminate the working surface S. In one aspect, the second light source 16 and the first light source 12 respectively illuminate different areas on the working surface S. In one aspect, there is no any optical component arranged inside the third opening 135 to expand or shrink emission light generated by the second light source 16.

The image sensor 18 is arranged under the third opening 135 (i.e. in the third space) and electrically coupled to the substrate 11 to receive/send signals therethrough. The image sensor 18 is a CMOS image sensor, a CCD image sensor or the like. In one aspect, the second light source 16 and the image sensor 18 are encapsulated in a same chip package, which is disposed on the substrate 11 and electrically connected thereto. In this case, a blocking layer is preferably formed between the second light source 16 and the image sensor 18 to prevent the emission light from the second light source 16 from directly being received by the image sensor 18. In other aspects, said chip package further has a processor, e.g., an application specific integrated circuit (ASIC) or a digital signal processor (DSP), to process image signals acquired by the image sensor 18.

The image sensor 18 has a sensing surface (e.g., the bottom surface in the figure). A part of the sensing surface overlaps the third opening 135 and another part of the sensing surface overlaps the second opening 133 and the lens 14. In this way, a part of the sensing surface of the image sensor 18 receives reflected light that enters the barrier structure 13 via the third opening 135, wherein the reflected light is formed after being emitted by the second light source 16 and then reflected by the working surface S. Another part of the sensing surface of the image sensor 18 receives reflected light via the lens 14 in the second opening 133, wherein the reflected light is formed after being emitted by the first light source 12 and then reflected by the working surface S.

In this embodiment, to prevent the reflected light associated with the first light source 12 from being received by the image sensor 18 via the third opening 135, the first plane surface 132 blocks a part of the first light source 12 (e.g., FIGS. 2 and 3 showing a half being blocked and the other half being exposed) to block reflected light of the emission light generated by the first light source 12 from entering the third opening 135. The area being blocked is determined according to a transverse distance between the first light source 12 and the image sensor 18 as well as a vertical distance between the first light source 12 and the working surface S. The inner surface of the first plane surface 132 is directly attached to the top of the first light source 12 or separated from the first light source 12.

In this embodiment, different areas of the image frame captured by the image sensor 18 is used by a processor (included in the chip package or coupled to the image sensor 18 via the substrate 11) to calculate the detection result of different light sources. Other arrangements are used in the present disclosure to avoid the interference between light from different light sources.

Figure 4:
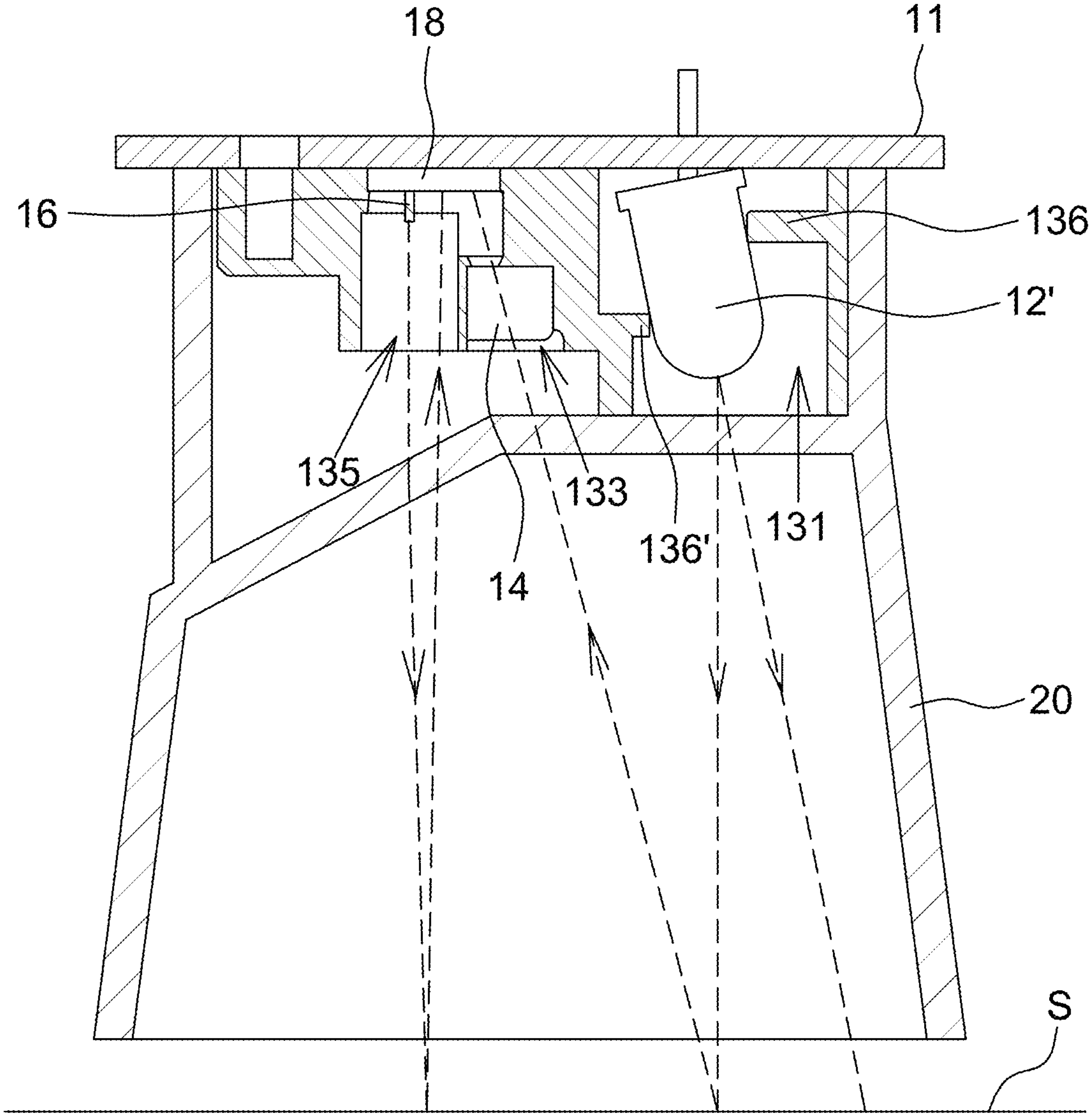
FIG. 4 is a cross-sectional view of an optical engine according to another embodiment of the present disclosure.

Referring to FIG. 4, it is a cross-sectional view of an optical engine and a hood 20 according to another embodiment of the present disclosure. In this embodiment, the first plane surface 132 does not cover upon the first light source 12. By arranging the first light source 12 to generate emission light leaving the first opening 131 in a direction tilted away from the lens 14 (e.g., FIG. 4 showing toward a lower-right direction), reflected light of the emission light generated by the first light source 12 only reaches the second opening 133 without entering the third opening 135.

The difference between this embodiment and that of FIG. 3 is that the first light source 12 is arranged with a tilted angle (i.e. an emission axis thereof not perpendicular to the substrate 11) to realize the objective of eliminating the interference. The arrangement of other components is identical to FIG. 3, and thus details thereof are not repeated herein.

In this embodiment, as the first light source 12 is arranged with a tilt angle, at least one protrusion structure (e.g., two protrusion structures 136 and 136' being shown herein, but not limited to) is selected to form inside the first opening 131 to press again and fix the first light source 12. In other aspects, the size of the first opening 131 (or first space) is manufactured to fit a size of the first light source 12 such that when the first light source 12 is inserted into the first space, the first light source 12 is fixed and has the predetermined tilt angle.

Figure 5:
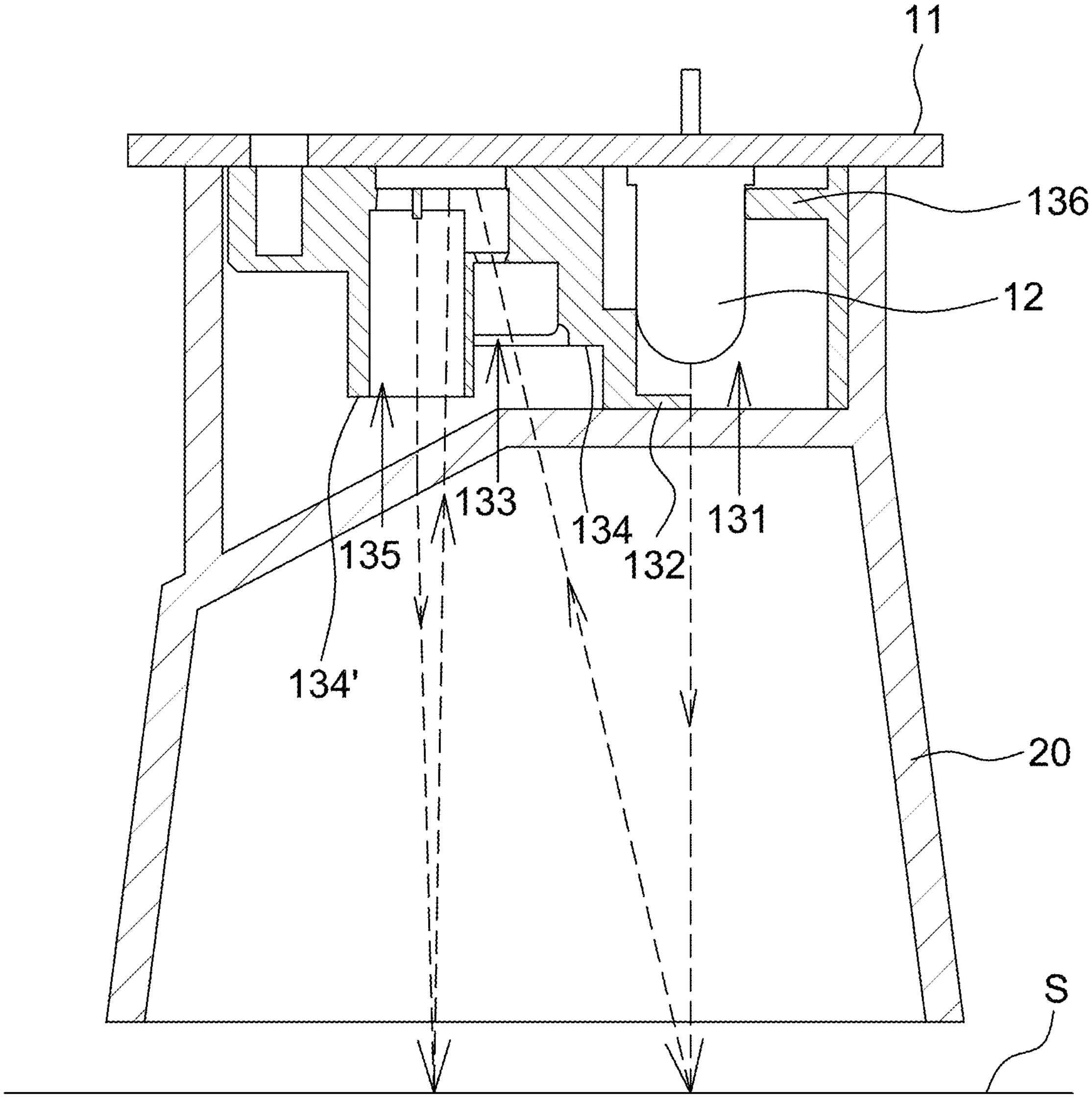
FIG. 5 is a cross-sectional view of an optical engine according to an alternative embodiment of the present disclosure.

Referring to FIG. 5, it is a cross-sectional view of an optical engine and a hood 20 according to an alternative embodiment of the present disclosure. In this embodiment, the barrier structure 13 has a first plane surface 132, a second plane surface 134 and a third plane surface 134', wherein the first plane surface 132 has a first opening 131 to have a first space therebelow; the second plane surface 134 has a second opening 133 to have a second space therebelow; and the third plane surface 134' has a third opening 135 to have a third space therebelow, and the second plane surface 134 is lower than the first plane surface 132 and the third plane surface 134'. More specifically, in this embodiment, a height of the side wall of the third opening 135 is increased to prevent reflected light, formed after being emitted by the first light source 12 and reflected by the working surface S, from entering the third opening 135. In one aspect, the first plane surface 132 and the third plane surface 134' have an identical height, but not limited to. The difference between this embodiment and that of FIG. 3 is that the side wall surrounding the third opening 135 (or third space) is increased to be higher than the second plane surface 134. The arrangement of other components is identical to FIG. 3 and thus details thereof are not repeated herein.

The hood 20 preferably has a tilted part 201 and a transverse part 203 therein (as shown in FIG. 3-5) that are transparent to the emission light of the second light source 16 and the first light source 12, respectively, or transparent to the sensing spectrum of the image sensor 18. The tilted part 201 preferably causes the emission light from the second light source 16 to be refracted (e.g., toward lower-right direction in figure) after passing through, and a refracted angle is arranged to cause the reflected light from the working surface S associated with the second light source 16 to propagate to the image sensor 18 via the third opening 135 instead of via the second opening 133. Preferably, the emission light of the first light source 12 is not refracted while passing through the transverse part 203.

In an alternative aspect, the transverse part 203 is arranged in the way to refract the emission light from the first light source 12 to bend toward right side of the figure to have the same effect of FIG. 4. In this way, the first light source 12 is not arranged in a tilt angle to prevent the emission light of the first light source 12 to be reflected to enter the third opening 135.

Although the above embodiments described that the reflected light associated of the first light source 12 does not enter the third opening 135 and the reflected light associated with the second light source 16 does not enter the second opening 133, it is appreciated that this only means most energy of the emission light of the first light source 12 and the second light source 16 does not enter the corresponding opening. As the working surface S has the light scattering effect, a small part of the emission light of the first light source 12 is still scattered to the third opening 135 and a small part of the emission light of the second light source 16 is still scattered to the second opening 133. As the energy of the scattered light is relatively small, detecting efficiency is considered not being affected thereby.

It is appreciated that the shape of every opening in the above embodiments is only intended to illustrate but not to limit the present disclosure.

As mentioned above, to normally operate on different working surfaces, in addition to enhance the post-processing ability of the processor, utilizing multiple light sources to operate corresponding to different working surfaces is another choice. Accordingly, the present disclosure provides an optical engine for navigation devices (e.g., FIGS. 1-6) that light up different light sources when a type of the working surface changes to improve the image feature in the image frames. By arranging a barrier structure, the optical engine of the present disclosure can eliminate the interference between emitted light and reflected light from different light sources to improve the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical engine, comprising:

a substrate;

a barrier, disposed on the substrate and comprising a first opening, a second opening and a third opening;

a first light source, arranged inside the first opening and electrically coupled to the substrate, and configured to generate emission light leaving the first opening in a direction perpendicular to the substrate;

a lens, arranged inside the second opening;

a second light source, arranged inside the third opening and electrically coupled to the substrate; and an image sensor, disposed on the substrate, and configured to receive reflected light of the first light source via the second opening or receive reflected light of the second light source via the third opening.

2. The optical engine as claimed in claim 1, wherein the first opening is on a first surface of the barrier, the second opening and the third opening are on a second surface of the barrier, and the first surface is higher than the second surface.

3. The optical engine as claimed in claim 1, wherein the second light source and the image sensor are encapsulated in a same chip package, and the first light source is a light emitting diode and the second light source is a laser diode.

4. The optical engine as claimed in claim 1, wherein the barrier further comprises a protrusion structure inside the first opening to press against and fix the first light source.

5. The optical engine as claimed in claim 1, wherein a part of a sensing surface of the image sensor overlaps the second opening in a longitudinal direction to receive the reflected light of the first light source via the lens in the second opening.

6. The optical engine as claimed in claim 2, wherein a part of the first light source closing to the second light source is covered by the first surface of the barrier.

7. The optical engine as claimed in claim 1, further comprising a hood arranged on the substrate and covering the barrier.

8. An optical engine, comprising:

a substrate;

a barrier, disposed on the substrate and comprising a first opening, a second opening and a third opening;

a first light source, arranged inside the first opening and electrically coupled to the substrate, and configured to generate emission light leaving the first opening in an angle tilted away from the second opening and the third opening;

a lens, arranged inside the second opening;

a second light source, arranged inside the third opening and electrically coupled to the substrate; and an image sensor, disposed on the substrate, and configured to receive reflected light of the first light source via the second opening or receive reflected light of the second light source via the third opening, wherein the first opening is on a first surface of the barrier, the second opening and the third opening are on a second surface of the barrier, and the first surface is higher than the second surface.

9. The optical engine as claimed in claim 8, wherein the second light source and the image sensor are encapsulated in a same chip package, and the first light source is a light emitting diode and the second light source is a laser diode.

10. The optical engine as claimed in claim 8, wherein the barrier further comprises at least one protrusion structure inside the first opening to press against the first light source to generate a tilted emission angle.

11. The optical engine as claimed in claim 8, wherein a part of a sensing surface of the image sensor overlaps the second opening in a longitudinal direction to receive the reflected light of the first light source via the lens in the second opening.

12. The optical engine as claimed in claim 8, wherein the first opening exposes the whole emission angle of the first light source.

13. The optical engine as claimed in claim 8, further comprising a hood arranged on the substrate and covering the barrier.

14. An optical engine, comprising:

a substrate;

a barrier, disposed on the substrate and comprising a first surface, a second surface and a third surface, wherein the first surface has a first opening, the second surface has a second opening and the third surface has a third opening, and the second surface is lower than the first and third surfaces;

a first light source, arranged inside the first opening and electrically coupled to the substrate, and configured to generate emission light leaving the first opening in a direction perpendicular to the substrate;

a lens, arranged inside the second opening;

a second light source, arranged inside the third opening and electrically coupled to the substrate; and an image sensor, disposed on the substrate, and configured to receive reflected light of the first light source via the second opening or receive reflected light of the second light source via the third opening.

15. The optical engine as claimed in claim 14, wherein a part of the first light source closing to the second light source is covered by the first surface of the barrier.

16. The optical engine as claimed in claim 14, wherein the barrier further comprises a protrusion structure inside the first opening to press against and fix the first light source.

17. The optical engine as claimed in claim 14, wherein a part of a sensing surface of the image sensor overlaps the second opening in a longitudinal direction to receive reflected light of the first light source via the lens in the second opening.

18. The optical engine as claimed in claim 14, wherein the first surface is higher than the third surface.

19. The optical engine as claimed in claim 14, further comprising a hood arranged on the substrate and covering the barrier.

* * * * *